United States Patent
Lee et al.

(10) Patent No.: US 10,492,556 B1
(45) Date of Patent: Dec. 3, 2019

(54) HEAD MOUNTED DEVICE

(71) Applicant: Primax Electronics Ltd., Taipei (TW)

(72) Inventors: Chia-Feng Lee, Taipei (TW); Chang-Tse Lee, Taipei (TW); Kai-Wen Cheng, Taipei (TW); Wei-Lung Huang, Taipei (TW)

(73) Assignee: PRIMAX ELECTRONICS LTD., Taipei (TW)

(*) Notice: Subject to any disclaimer, the term of this patent is extended or adjusted under 35 U.S.C. 154(b) by 0 days.

(21) Appl. No.: 16/143,454

(22) Filed: Sep. 27, 2018

(30) Foreign Application Priority Data

Jun. 22, 2018 (TW) .............................. 107121535 A

(51) Int. Cl.
*H04R 1/28* (2006.01)
*A42B 3/04* (2006.01)
*F16B 47/00* (2006.01)
*A42B 3/30* (2006.01)

(52) U.S. Cl.
CPC .............. *A42B 3/044* (2013.01); *A42B 3/042* (2013.01); *A42B 3/306* (2013.01); *F16B 47/00* (2013.01); *H04R 1/2807* (2013.01)

(58) Field of Classification Search
CPC ......... A42B 3/044; A42B 3/042; A42B 3/306; F16B 47/00; H04R 1/2807
See application file for complete search history.

(56) References Cited

U.S. PATENT DOCUMENTS

| | | | |
|---|---|---|---|
| 7,219,370 B1* | 5/2007 | Teetzel ..................... | A42B 3/04 2/422 |
| 2009/0070967 A1* | 3/2009 | Gonzalez ............... | A42B 3/044 24/16 R |
| 2014/0352033 A1* | 12/2014 | Bryan ...................... | A42B 3/04 2/244 |
| 2016/0249700 A1* | 9/2016 | Zhavoronkov ........ | G08B 21/02 2/421 |
| 2017/0264984 A1* | 9/2017 | Pelland ................ | H04R 1/1066 |
| 2017/0340046 A1* | 11/2017 | Le ............................ | A42B 3/16 |
| 2018/0094765 A1* | 4/2018 | Riddiford ............ | F16M 11/041 |
| 2018/0192727 A1* | 7/2018 | Chen ..................... | A42B 3/0406 |

* cited by examiner

*Primary Examiner* — Tuan D Nguyen
(74) *Attorney, Agent, or Firm* — Kirton McConkie; Evan R. Witt

(57) ABSTRACT

A head mounted device for a helmet includes a connection module, a flexible bracket, a power supply seat and a function module. While the flexible bracket is moved relative to the connection module, a position of the power supply seat relative to the helmet is adjusted. While the function module is moved relative to the power supply seat, an orientation of the function unit is adjusted.

14 Claims, 9 Drawing Sheets

HEAD MOUNTED DEVICE

FIELD OF THE INVENTION

The present invention relates to a head mounted device, and more particularly to a head mounted device fixed on a helmet.

BACKGROUND OF THE INVENTION

Taiwan is small in area but highly populated. Because of traffic congestion, locomotives have become the main transportation means for people. As the number of locomotives increases, major traffic accidents have also been reported. In the event of an accident, it is often difficult for the parties to state the complete accident because of excessive mental tension and panic. Consequently, the parties cannot clarify the attribution of responsibility. For solving this problem, a driving recorder is usually installed on the locomotive or the helmet to record the driving condition at any time when people are driving on the road. When an accident occurs, the responsibility of both parties can be clarified according to the recorded images.

Nowadays, the driving recorder for the locomotive is usually installed on the helmet. However, since the existing driving recorder cannot be applied to various kinds of helmets, the user has to purchase different kinds of brackets to install the driving recorder. In addition, the user cannot adjust the position of the bracket and the orientation of the driving recorder according to the user's preference.

For solving the drawbacks of the conventional technologies, the present invention provides a head mounted device having the functions of adjusting the position of the bracket and the orientation of the function module in order to increase the applications.

SUMMARY OF THE INVENTION

The present invention provides a head mounted device having the functions of adjusting the position of the bracket and the orientation of the function module. Consequently, the head mounted device can be applied to various types of helmets.

In accordance with an aspect of the present invention, there is provided a head mounted device for a helmet. The head mounted device includes a connection module, a flexible bracket, a power supply seat and a function module. The connection module includes a connection part and a fixing part. The connection part is detachably connected with the helmet. The fixing part is connected with the connection part. The flexible bracket is locked on the helmet and adjustably connected with the fixing part. The power supply seat is located at a first end of the flexible bracket. The function module is adjustably connected with the power supply seat. The function module includes a function unit. While the flexible bracket is moved relative to the connection module, a position of the power supply seat relative to the helmet is adjusted. While the function module is moved relative to the power supply seat, an orientation of the function unit is adjusted.

In an embodiment, the head mounted device further includes an energy storage module. The energy storage module is located at a second end of the flexible bracket that is opposed to the power supply seat. The energy storage module is electrically connected with the power supply seat to provide electricity to the function module.

In an embodiment, the power supply seat includes an accommodation space, and the function module is accommodated within the accommodation space.

In an embodiment, the power supply seat further includes a first metal contact, and the first metal contact is disposed within the accommodation space. The function module further includes a second metal contact corresponding to the first metal contact.

In an embodiment, the power supply seat further includes a first magnetic part, and the first magnetic part is disposed within the accommodation space. The function module further includes a second magnetic part corresponding to the first magnetic part.

In an embodiment, the flexible bracket further includes an anti-slip element. The anti-slip element is arranged between the flexible bracket and the helmet.

In an embodiment, the connection part is a suction cup.

In an embodiment, the fixing part includes a position-limiting recess, and the flexible bracket includes an adjusting hole. The fixing part is penetrated through the adjusting hole, and a portion of the flexible bracket is embedded within the position-limiting recess.

In an embodiment, the fixing part is a clamping structure with a guiding recess, the flexible bracket is clamped by the clamping structure, and the flexible bracket is movable within the guiding recess.

In an embodiment, the function module is a light source module, a camera module or a speaker module.

In an embodiment, the function unit of the light source module is a light-emitting element.

In an embodiment, the function unit of the camera module is a camera lens.

In an embodiment, the function unit of the speaker module is a sound output part.

In an embodiment, a locking angle of the flexible bracket to be locked on the helmet is in a range between 30 degrees and 120 degrees.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
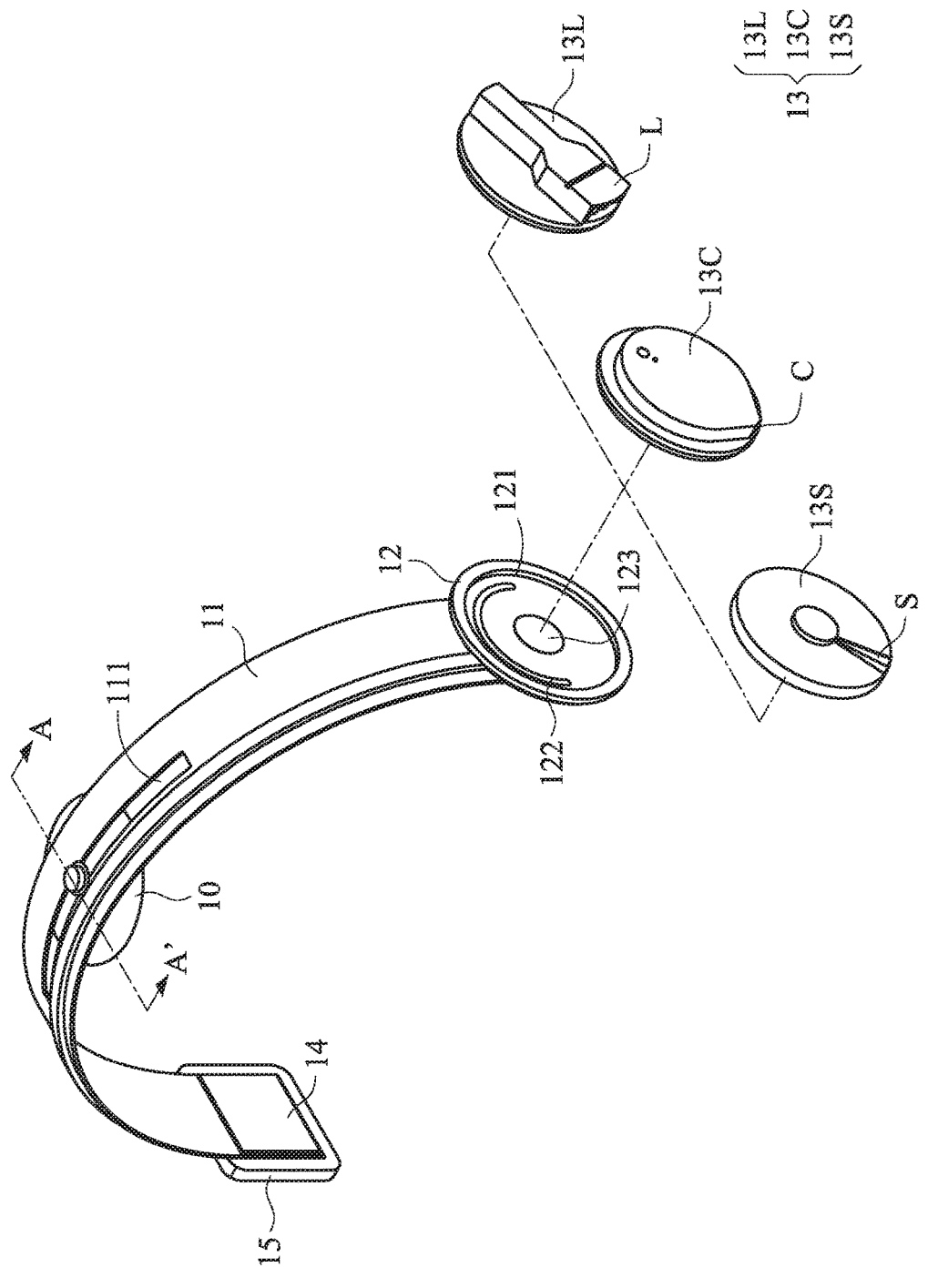
FIG. 1A is a schematic perspective view illustrating a head mounted device according to a first embodiment of the present invention and taken along a viewpoint.
Figure 1B:
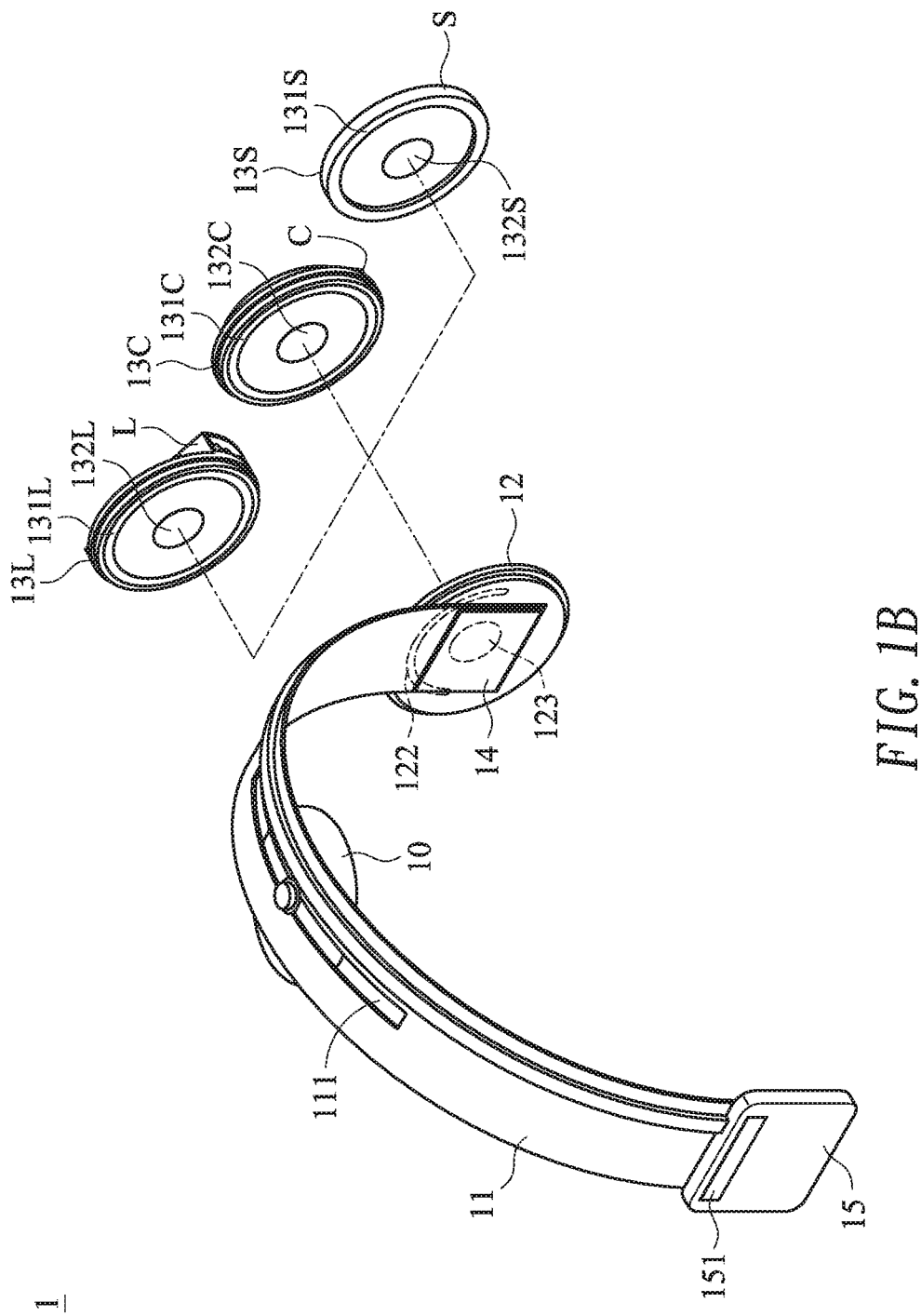
FIG. 1B is a schematic perspective view illustrating the head mounted device according to the first embodiment of the present invention and taken along another viewpoint.

Please refer to FIGS. 1A and 1B. FIG. 1A is a schematic perspective view illustrating a head mounted device according to a first embodiment of the present invention and taken along a viewpoint. FIG. 1B is a schematic perspective view illustrating the head mounted device according to the first embodiment of the present invention and taken along another viewpoint.

As shown in FIG. 1A, the head mounted device 1 comprises a connection module 10, a flexible bracket 11, a power supply seat 12, a function module 13, two anti-slip elements 14 and an energy storage module 15.

The flexible bracket 11 comprises an adjusting hole 111. The flexible bracket 11 is adjustably connected with the connection module 10 through the adjusting hole 111. In an embodiment, the flexible bracket 11 is made of acrylonitrile butadiene styrene (ABS) resin, polycarbonate (PC) resin or a mixture of ABS resin and PC resin. Consequently, the mechanical strength and toughness of the flexible bracket 11 are increased. The power supply seat 12 is located at a first end of the flexible bracket 11. Moreover, the power supply seat 12 comprises an accommodation space 121 for accommodating the function module 13. The power supply seat 12 further comprises a first metal contact 122 and a first magnetic part 123. The first metal contact 122 is arc-shaped and disposed on a bottom surface of the accommodation space 121. The first magnetic part 123 is disposed on a middle region of the bottom surface of the accommodation space 121.

Please refer to FIG. 1B again. The function module 13 is selected from at least one of a light source module 13L, a camera module 13C and a speaker module 13S. Each function module 13 comprises a function unit. For example, a light-emitting element L of the light source module 13L, a camera lens C of a camera module 13C or a sound output part S of the speaker module 13S is the example of the function unit. The function module 13 further comprises a second metal contact and a second magnetic element. The second contact and the second magnetic element are disposed on a surface of the function module 13 that is opposed to the function unit. For example, the light source module 13L comprises the second metal contact 131L and the second magnetic element 132L, the camera module 13C comprises the second metal contact 131C and the second magnetic element 132C, and the speaker module 13S comprises the second metal contact 131S and the second magnetic element 132S. The positions of the second magnetic elements 132L, 132C and 132S correspond to the position of the first magnetic part 123. The second metal contacts 131L, 131C and 131S are arranged around the second magnetic elements 132L, 132C and 132S, respectively. The positions of the second metal contacts 131L, 131C and 131S correspond to the position of the first metal contact 122. In this embodiment, each function module comprises a single function module. It is noted that numerous modifications and alterations may be made while retaining the teachings of the invention. For example, in some other embodiments, each function module comprises plural different function units.

When the light source module 13L, the camera module 13C or the speaker module 13S is disposed within the accommodation space 121 of the power supply seat 12, the first magnetic part 123 and the second magnetic element 132L, 132C or 132S are magnetically attracted by each other. Consequently, the light source module 13L, the camera module 13C or the speaker module 13S is adjustably connected with the power supply seat 12. The first metal contact 122 is contacted with the second metal contact 131L, 131C or 131S. Consequently, the electric connection between the power supply seat 12 and the function module 13 is established. In an embodiment, the first magnetic part 123 is a permanent magnet, and each of the second magnetic elements 132L, 132C and 132S is a metal plate that is magnetically attracted by the permanent magnet. Alternatively, each of the second magnetic elements 132L, 132C and 132S is a permanent magnet, and the first magnetic part 123 is a metal plate that is magnetically attracted by the permanent magnet. Alternatively, the first magnetic part 123 and each of the second magnetic elements 132L, 132C and 132S are permanent magnets that are magnetically attracted by each other. As mentioned above, the first metal contact 122 is arc-shaped, and the second metal contacts 131L, 131C and 131S are respectively arranged around the second magnetic elements 132L, 132C and 132S. Consequently, while the function module 13 is rotated and the orientation of the function module 13 is adjusted, the first metal contact 122 is continuously contacted with the second metal contact 131L, 131C or 131S. In other words, the electric connection between the power supply seat 12 and the function module 13 is maintained.

Please refer to FIGS. 1A and 1B again. The energy storage module 15 is located at a second end of the flexible bracket 11 that is opposed to the power supply seat 12. The energy storage module 15 further comprises a display unit 151. The information about the residual electric quantity is shown on the display unit 151. The energy storage module 15 is electrically connected with the power supply seat 12 through a circuitry (not shown) that is buried within the flexible bracket 11. Consequently, the power supply seat 12 can provide the electricity to the function module 13 to power the function module 13. An example of the energy storage module 15 includes but is not limited to a carbon zinc battery, an alkaline battery, a nickel hydrogen battery, a nickel cadmium battery or a lithium battery. In an embodiment, the energy storage module 15 is detachably disposed on the flexible bracket 11. In case that the residual electricity of the energy storage module 15 shown on the display unit 151 is very low, the energy storage module 15 is detached and replaced. Alternatively, the energy storage module 15 is fixed on the flexible bracket 11, and the energy storage module 15 is charged through a connection interface (not shown) that is installed on the energy storage module 15. For example, the connection interface is a universal serial bus (USB) interface or a lightning interface.

The two anti-slip elements 14 are disposed on an inner surface of the flexible bracket 11. Moreover, the two anti-slip elements 14 are opposed to the power supply seat 12 and the energy storage module 15, respectively. When the flexible bracket 11 is connected with and locked on the helmet, the anti-slip element 14 is in contacted with the surface of the helmet. Consequently, the flexible bracket 11 is not moved, slid or detached. For example, the anti-slip elements 14 are anti-slip rubbery elements. In an embodiment, the two anti-slip elements 14 are disposed on an inner surface of the flexible bracket 11 and respectively located at the first end and the second end of the flexible bracket 11. It is noted that the positions of the anti-slip elements 14 are not restricted. For example, the anti-slip elements 14 may be disposed on any positions that are in contacted with the surface of the helmet.

Figure 1C:
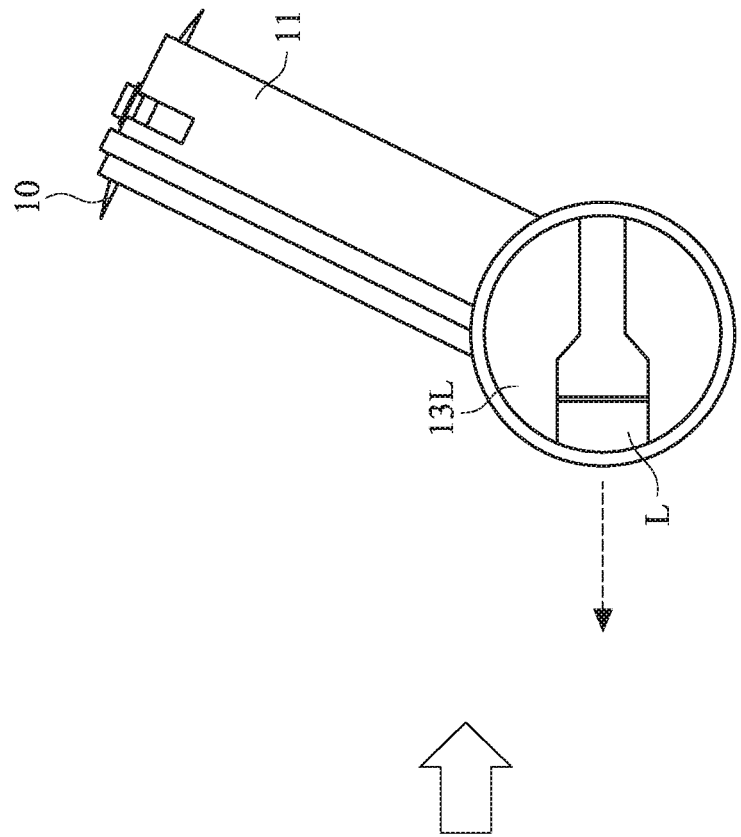
FIG. 1C schematically illustrates the actions of the function module of the head mounted device according to the first embodiment of the present invention.
Figure 1C:
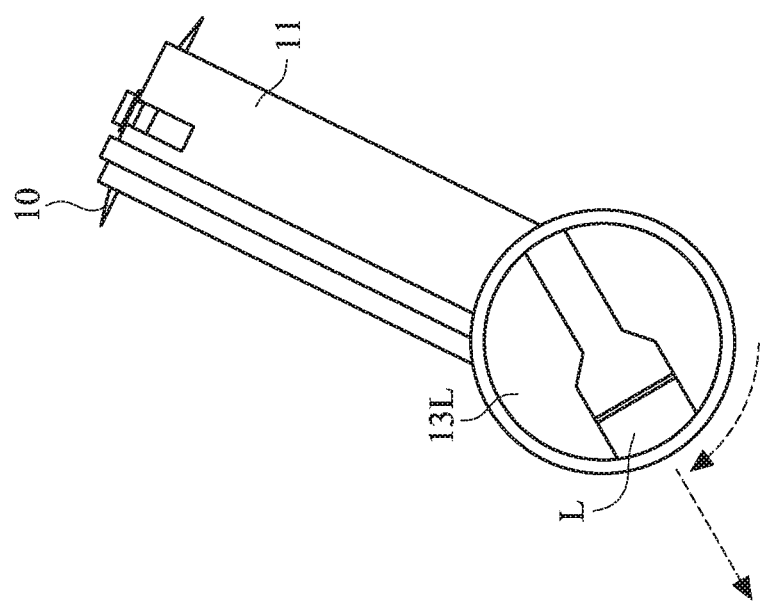

FIG. 1C schematically illustrates the actions of the function module of the head mounted device according to the first embodiment of the present invention. For example, the function module 13 is the light source module 13L. The light source module 13L may be adjusted according to the user's preference or habit. As the light source module 13L is moved relative to the power supply seat 12 (see FIG. 1A), the orientation of the light-emitting element L is correspondingly adjusted. Consequently, the light beam from the light-emitting element L may be projected to different directions. Similarly, the orientation of the camera lens C of the camera module 13C or the orientation of the sound output part S of the speaker module 13S may be adjusted.

Figure 2A:
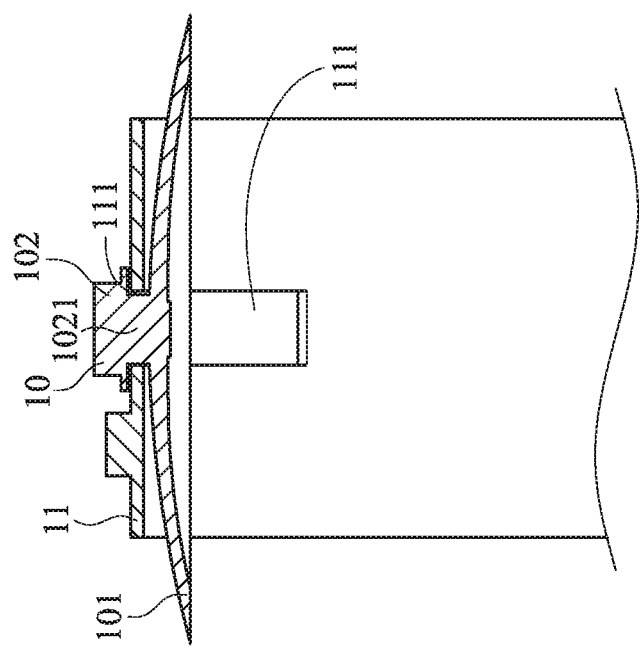
FIG. 2A is a schematic cross-sectional view illustrating a portion of the head mounted device of FIG. 1A and taken along the line A-A'.
Figure 2B:
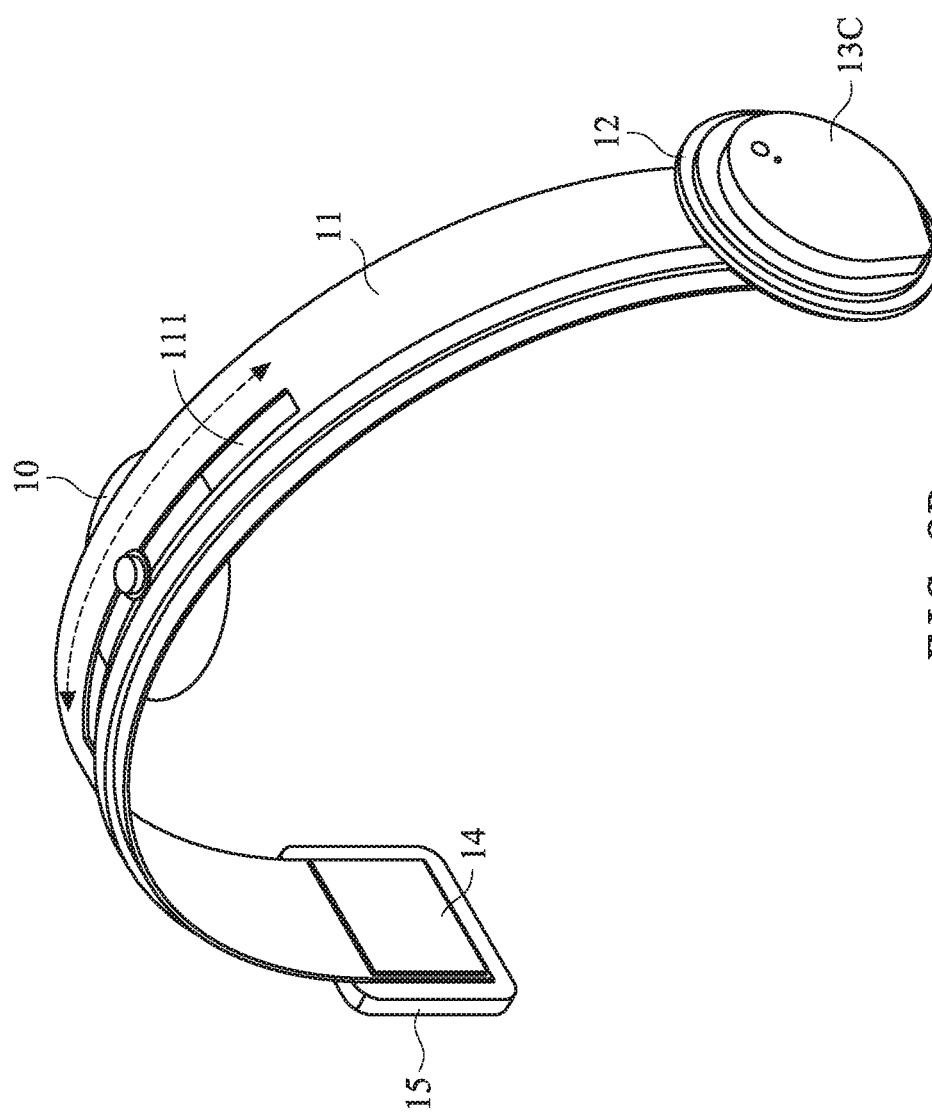
FIG. 2B schematically illustrates the actions of the flexible bracket of the head mounted device according to the first embodiment of the present invention.

Please refer to FIGS. 2A and 2B. FIG. 2A is a schematic cross-sectional view illustrating a portion of the head mounted device of FIG. 1A and taken along the line A-A'. FIG. 2B schematically illustrates the actions of the flexible bracket of the head mounted device according to the first embodiment of the present invention. As shown in FIG. 2A, the connection module 10 comprises a connection part 101 and a fixing part 102. For example, the connection part 101 is a suction cup. Consequently, the connection part 101 is detachably connected with the surface of the helmet. The fixing part 102 is connected with an end of the connection part 101. The fixing part 102 comprises a position-limiting recess 1021. The fixing part 102 is penetrated through the adjusting hole 111. Consequently, a portion of the flexible bracket 11 is embedded within the position-limiting recess 1021. As the flexible bracket 11 is slid within the position-limiting recess 1021, the flexible bracket 11 is adjustably connected with the connection module 10. Please refer to FIG. 2B again. After the connection module 10 is connected with the surface of the helmet (not shown) through the connection part 101, the flexible bracket 11 is moved relative to the connection module 10. Consequently, the position of the power supply seat 12 relative to the helmet is adjusted.

Figure 3A:
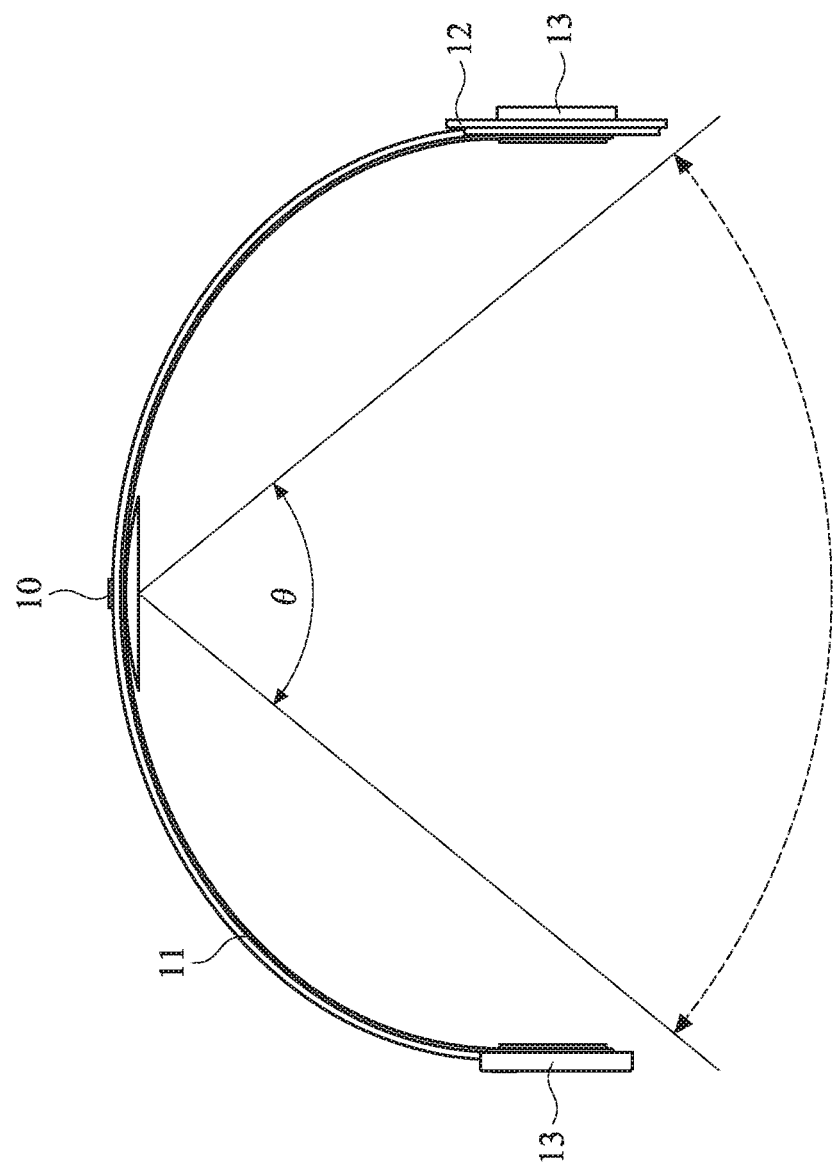
FIG. 3A is a schematic front view illustrating the head mounted device according to the first embodiment of the present invention.
Figure 3B:
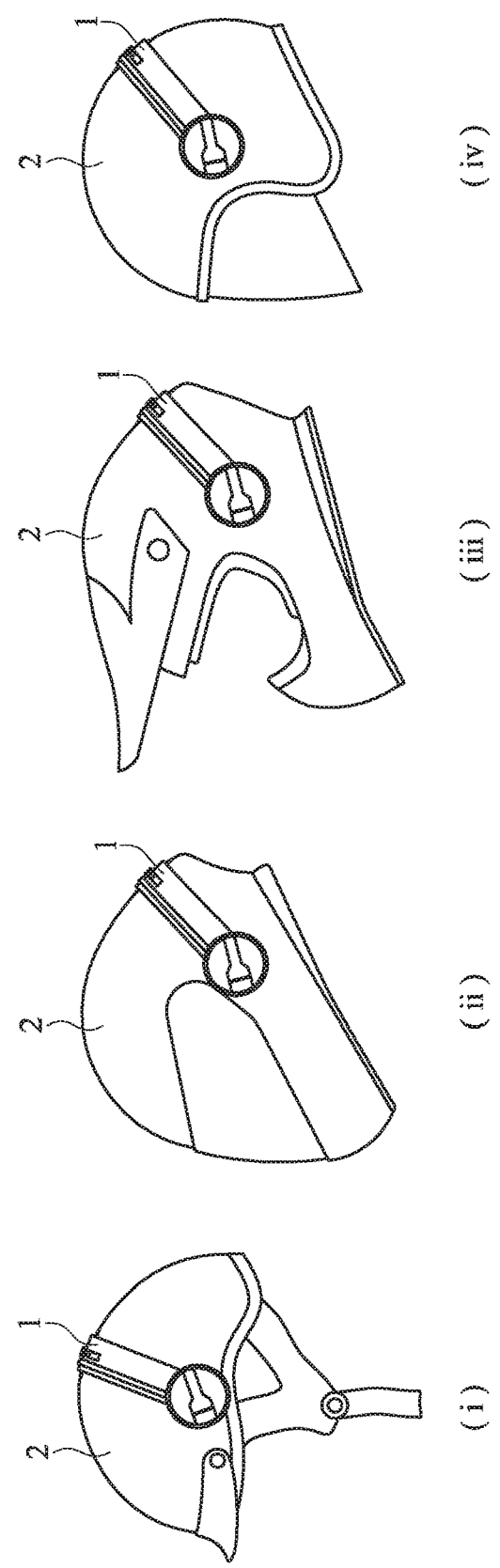
FIG. 3B schematically illustrate some examples of locking the head mounted device of the first embodiment on the helmet.

Please refer to FIGS. 3A and 3B. FIG. 3A is a schematic front view illustrating the head mounted device according to the first embodiment of the present invention. FIG. 3B schematically illustrate some examples of locking the head mounted device of the first embodiment on the helmet. As mentioned above, the flexible bracket 11 of the head mounted device 1 has good mechanical strength and toughness. As shown in FIG. 3A, the locking angle θ of the flexible bracket 11 is in the range between 30 degrees and 120 degrees. Consequently, the head mounted device 1 can be locked on the helmet with a different type, size or shape. Please refer to FIG. 3B. In the examples (i), (ii), (iii) and (iv), the head mounted device 1 is locked on various helmets.

Figure 4A:
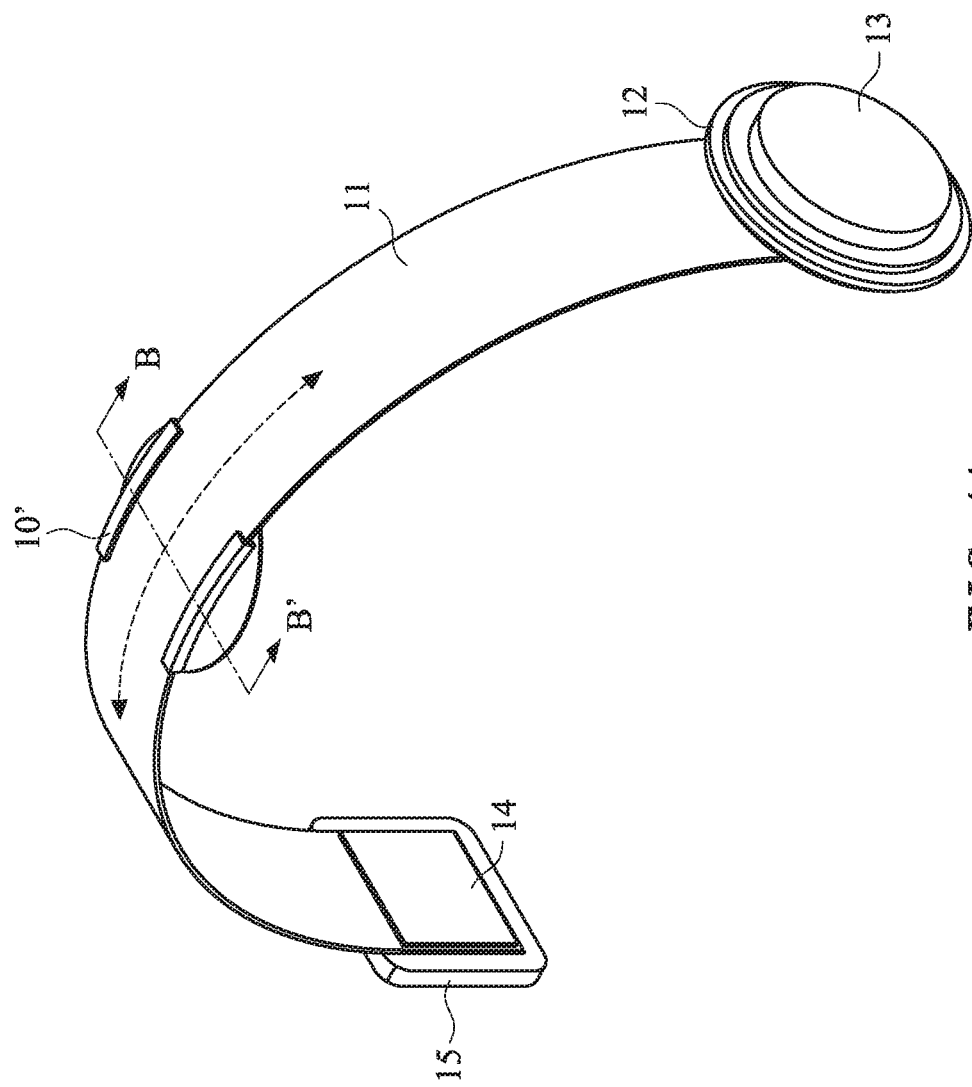
FIG. 4A is a schematic perspective view illustrating a head mounted device according to a second embodiment of the present invention.
Figure 4B:
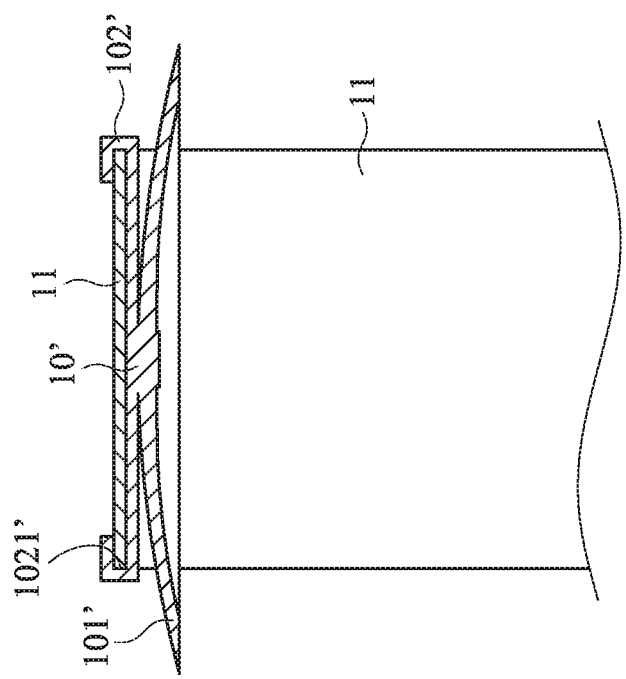
FIG. 4B is a schematic cross-sectional view illustrating a portion of the head mounted device of FIG. 4A and taken along the line B-B'.

Please refer to FIGS. 4A and 4B. FIG. 4A is a schematic perspective view illustrating a head mounted device according to a second embodiment of the present invention. FIG. 4B is a schematic cross-sectional view illustrating a portion of the head mounted device of FIG. 4A and taken along the line B-B'. As shown in FIG. 4B, the connection module 10' comprises a connection part 101' and a fixing part 102'. For example, the connection part 101' is also a suction cup. Consequently, the connection part 101' is detachably connected with the surface of the helmet. The fixing part 102' is connected with an end of the connection part 101'. The fixing part 102 is a clamping structure with a guiding recess 1021'. The clamping structure is used for clamping the flexible bracket 11. As the flexible bracket 11 is moved within the guiding recess 1021', the flexible bracket 11 is adjustably connected with the connection module 10'. After the connection module 10' is connected with the surface of the helmet (not shown) through the connection part 101', the flexible bracket 11 is moved relative to the connection module 10'. Consequently, the position of the power supply seat 12 relative to the helmet is adjusted.

From the above descriptions, the present invention provides the head mounted device. Since the position of the flexible bracket and the orientation of the function module are adjustable, the head mounted device can meet the requirements of different users and applied to various types of helmets. In other words, the head mounted device of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A head mounted device for a helmet, the head mounted device comprising:
a connection module comprising a connection part and a fixing part, wherein the connection part is detachably connected with the helmet, and the fixing part is connected with the connection part;
a flexible bracket locked on the helmet and adjustably connected with the fixing part;
a power supply seat located at a first end of the flexible bracket; and
a function module adjustably connected with the power supply seat, wherein the function module comprises a function unit,
wherein while the flexible bracket is moved relative to the connection module, a position of the power supply seat relative to the helmet is adjusted, wherein while the function module is moved relative to the power supply seat, an orientation of the function unit is adjusted.

2. The head mounted device according to claim 1, wherein the head mounted device further comprises an energy storage module, wherein the energy storage module is located at a second end of the flexible bracket that is opposed to the power supply seat, and the energy storage module is electrically connected with the power supply seat to provide electricity to the function module.

3. The head mounted device according to claim 1, wherein the power supply seat comprises an accommodation space, and the function module is accommodated within the accommodation space.

4. The head mounted device according to claim 3, wherein the power supply seat further comprises a first metal contact, and the first metal contact is disposed within the accommodation space, wherein the function module further comprises a second metal contact corresponding to the first metal contact.

5. The head mounted device according to claim 3, wherein the power supply seat further comprises a first magnetic part, and the first magnetic part is disposed within the accommodation space, wherein the function module further comprises a second magnetic part corresponding to the first magnetic part.

6. The head mounted device according to claim 1, wherein the flexible bracket further comprises an anti-slip element, which is arranged between the flexible bracket and the helmet.

7. The head mounted device according to claim 1, wherein the connection part is a suction cup.

8. The head mounted device according to claim 7, wherein the fixing part comprises a position-limiting recess, and the flexible bracket comprises an adjusting hole, wherein the fixing part is penetrated through the adjusting hole, and a portion of the flexible bracket is embedded within the position-limiting recess.

9. The head mounted device according to claim 7, wherein the fixing part is a clamping structure with a guiding recess, the flexible bracket is clamped by the clamping structure, and the flexible bracket is movable within the guiding recess.

10. The head mounted device according to claim 1, wherein the function module is a light source module, a camera module or a speaker module.

11. The head mounted device according to claim 10, wherein the function unit of the light source module is a light-emitting element.

12. The head mounted device according to claim 10, wherein the function unit of the camera module is a camera lens.

13. The head mounted device according to claim 10, wherein the function unit of the speaker module is a sound output part.

14. The head mounted device according to claim 1, wherein a locking angle of the flexible bracket to be locked on the helmet is in a range between 30 degrees and 120 degrees.

* * * * *